(12) United States Patent
Moeykens et al.

(10) Patent No.: US 11,453,511 B1
(45) Date of Patent: Sep. 27, 2022

(54) SYSTEMS AND METHODS FOR DATA VERIFICATION AT START UP

(71) Applicant: BETA AIR, LLC, South Burlington, VT (US)

(72) Inventors: Vincent Moeykens, Burlington, VT (US); Alexander Hoekje List, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/374,106

(22) Filed: Jul. 13, 2021

(51) Int. Cl.
| | |
|---|---|
| *B64D 45/00* | (2006.01) |
| *G07C 5/08* | (2006.01) |
| *B64C 29/00* | (2006.01) |
| *G05D 1/00* | (2006.01) |
| *G06N 20/00* | (2019.01) |
| *G05D 1/10* | (2006.01) |

(52) U.S. Cl.
CPC .......... *B64D 45/00* (2013.01); *B64C 29/0016* (2013.01); *G05D 1/102* (2013.01); *G06N 20/00* (2019.01); *G07C 5/085* (2013.01); *B64D 2045/0085* (2013.01); *G05D 1/0038* (2013.01)

(58) Field of Classification Search
None
See application file for complete search history.

(56) References Cited

U.S. PATENT DOCUMENTS

| 10,040,552 | B2 | 8/2018 | Gordon et al. |
| 10,293,922 | B2 | 5/2019 | Cox et al. |
| 10,322,824 | B1 | 6/2019 | Demont et al. |
| 10,450,055 | B2 | 10/2019 | Huynh et al. |
| 10,719,772 | B2 * | 7/2020 | Boggio .............. G05B 23/0283 |
| 10,810,501 | B1 | 10/2020 | Kimchi et al. |
| 11,100,589 | B1 * | 8/2021 | Binion ................... G01C 23/00 |

(Continued)

FOREIGN PATENT DOCUMENTS

| CN | WO2019242197 | * | 6/2018 | |
| CN | 109606730 A | * | 4/2019 | ................ B64F 5/60 |

(Continued)

OTHER PUBLICATIONS

Aamod Samuel and Yohan Lin, Airvolt Aircraft Electric Propulsion Test Stand, Jan. 1, 2016.

*Primary Examiner* — Abdhesh K Jha
(74) *Attorney, Agent, or Firm* — Caldwell Intellectual Property Law

(57) ABSTRACT

Embodiments of the systems and methods disclosed herein describe a data verification of electrical electric components and software systems electronically or mechanically coupled to the electric aircraft by a novel process which starts an electric aircraft and receives physical and software information for each aircraft component or system and determines the status of the health of each of those components or systems. An embodiment may further include a monitoring system configured to measure a plurality of data from each aircraft component and a flight controller communicatively coupled to the monitoring system, wherein the data verification can be performed by the flight controller. Further embodiments may include the flight controller generating an output datum from the assessment produced by the data verification and displaying it to a pilot via an output device.

20 Claims, 7 Drawing Sheets

(56) References Cited

U.S. PATENT DOCUMENTS

| | | | |
|---|---|---|---|
| 2007/0142980 A1 | 6/2007 | Ausman et al. | |
| 2013/0177712 A1* | 7/2013 | Binder | C23C 4/12 |
| | | | 427/456 |
| 2015/0032297 A1 | 1/2015 | Loewen et al. | |
| 2020/0180783 A1 | 6/2020 | Cox et al. | |
| 2020/0278701 A1* | 9/2020 | Kang | B64C 29/0033 |
| 2020/0290750 A1 | 9/2020 | Ferrell et al. | |
| 2021/0157561 A1* | 5/2021 | Gilton | G06Q 30/01 |
| 2021/0182274 A1* | 6/2021 | Toews | G06F 16/958 |

FOREIGN PATENT DOCUMENTS

| | | | | |
|---|---|---|---|---|
| CN | 112988204 A | * | 6/2021 | |
| GB | 2589300 A | * | 6/2021 | B64D 27/24 |
| WO | 2021063830 | | 4/2021 | |

\* cited by examiner

SYSTEMS AND METHODS FOR DATA VERIFICATION AT START UP

FIELD OF THE INVENTION

The present invention generally relates to the field of data verification. In particular, the present invention is directed to systems and methods for data verification at the start up of an electric aircraft.

BACKGROUND

Before an electric aircraft lifts off and/or takes flight, a pilot will usually start up the electric aircraft along with its software and electric components. During this stage, there may exist a situation where a pilot may overlook the status of each electrical component and/or software program electronically and mechanically coupled to the electric aircraft. As a result, a safe and efficient flight may not be achievable if a pilot does not become aware of the status of each sub-system of the electric if those sub-systems pose a risk of malfunction for the electric aircraft at the start up of the electric aircraft and/or before the electric aircraft lifts off and/or takes flight.

SUMMARY OF THE DISCLOSURE

In an aspect, a system for data verification of an electric aircraft at start up that includes at least an electrical component. The system includes a health monitoring system configured to measure a plurality of data of the at least an electrical component. The system further includes a flight controller communicatively connected to the at least an electrical component wherein the flight controller includes a verification system configured to start an electric aircraft, detect an operational datum from an electric component, receive an operational datum from the health monitoring system, determine an assessment datum pertaining to the electric aircraft, identify a software datum, determine a software status datum, and generate an output datum from the assessment datum and software status datum. The system further includes an output device, the output device comprising, a pilot display, the pilot display configured to display an output datum to a pilot.

In another aspect, a method of data verification of an electric aircraft at start up includes starting an electric aircraft, detecting an operational datum of an electric component including at least a monitoring system, receiving an operational datum as a function of a monitoring system or a plurality of monitoring systems. The method includes measuring an assessment datum, as a function of the operational datum pertaining to the electric aircraft. The method includes receiving, by a flight controller, a software datum. The method includes generating a software status datum, as a function of the software datum. The method includes determining whether the software of each software program of the electric aircraft is the correct version. The method includes displaying, by an output device, the output datum comprising: a signal or symbol representing the software version state of each monitoring system to a pilot, a confirmation sign indicating a system's software is up to date to a pilot, a warning sign indicating a system's software is outdated to a pilot, and informing the pilot the integrity of the health monitoring system and/or software system of the electric aircraft including a degradation of a system's software and/or monitoring system of the electric aircraft, and an indication of an occurrence of a fault of a software system and/or monitoring system.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for data verification at the startup of an electric aircraft. Embodiments of the systems and methods disclosed herein describe a data verification of electrical electric components and software systems electronically or mechanically coupled to the electric aircraft by a novel process which receives physical and software information for each aircraft component or system and determines the status of the health of each of those components or systems. In an embodiment, the health status is determined by a monitoring system is configured to check the operability of each component and/or the software version for each software system is satisfactory and or correct. Embodiments of the system and method may further include a monitoring system configured to measure a plurality of data from each aircraft component and a flight controller communicatively coupled to the monitoring system, wherein the data verification can be performed by the flight controller. Further embodiments may include the flight controller generating an output datum from the assessment produced by the data verification and displaying it to a pilot via an output device.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments.

Figure 1:
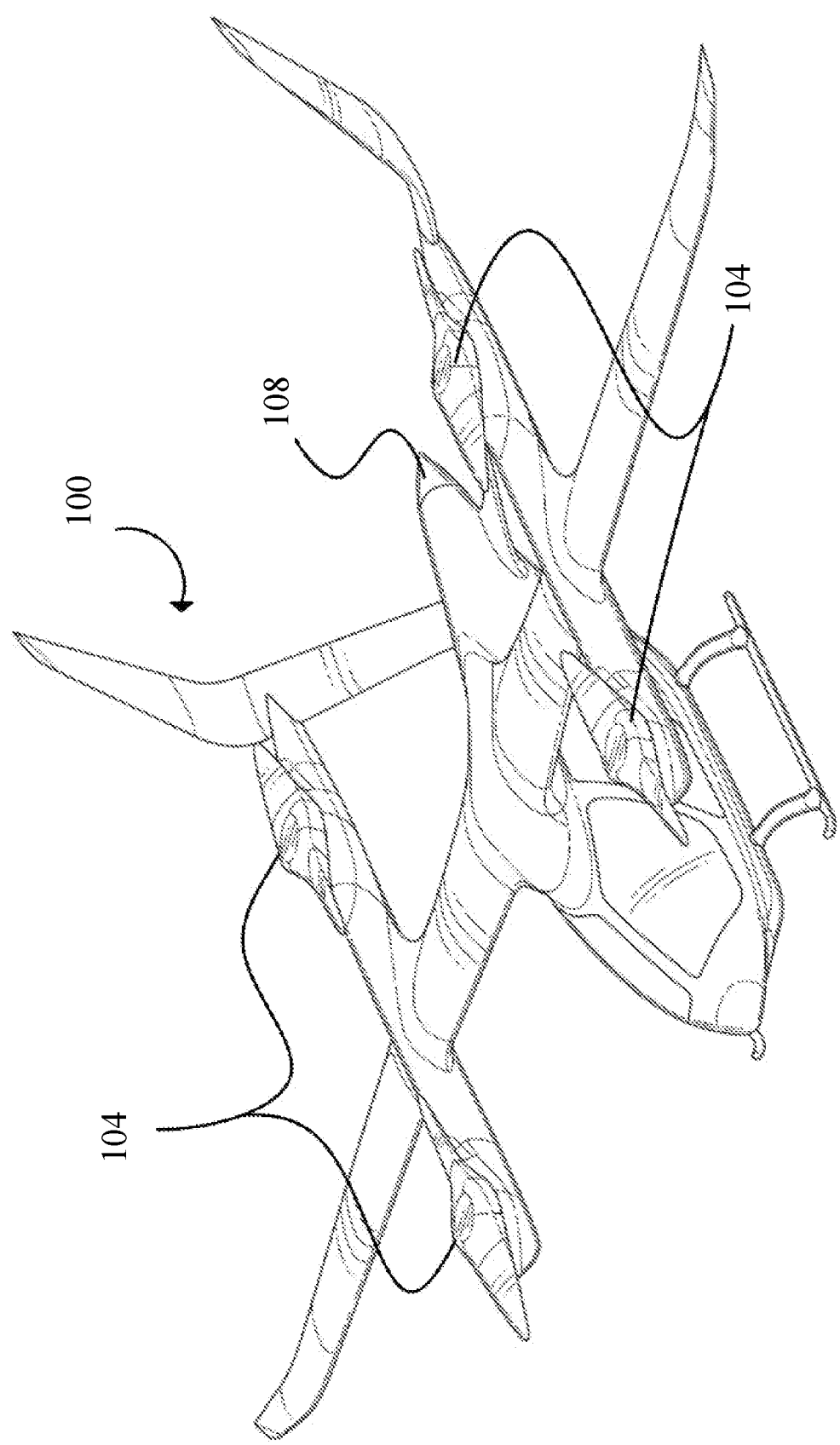
FIG. 1 is an illustration of an embodiment of an electric aircraft.

Referring now to FIG. 1, an embodiment of an electric aircraft 100 is presented. Electric aircraft 100 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Still referring to FIG. 1, electric aircraft may include an energy source. An energy source may include, for example, a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which in-flight system 100 may be incorporated.

Still referring to FIG. 1, an embodiment of an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff In an embodiment, the energy source may be capable of providing sufficient electrical power for auxiliary loads including without limitation, lighting, navigation, communications, de-icing, steering, or other systems requiring power or energy. Further, the energy source may be capable of providing sufficient power for controlled descent and landing protocols, including, without limitation, hovering descent, or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source can include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

With continued reference to FIG. 1, a number of aerodynamic forces may act upon the electric aircraft 100 during flight. Forces acting on an electric aircraft 100 during flight may include, without limitation, thrust, the forward force produced by the rotating element of the electric aircraft 100 and acts parallel to the longitudinal axis. Another force acting upon electric aircraft 100 may be, without limitation, drag, which may be defined as a rearward retarding force which is caused by disruption of airflow by any protruding surface of the electric aircraft 100 such as, without limitation, the wing, rotor, and fuselage. Drag may oppose thrust and acts rearward parallel to the relative wind. A further force acting upon electric aircraft 100 may include, without limitation, weight, which may include a combined load of the electric aircraft 100 itself, crew, baggage, and/or fuel. Weight may pull electric aircraft 100 downward due to the force of gravity. An additional force acting on electric aircraft 100 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 100 are designed to be as lightweight as possible. Reducing the weight of the aircraft and designing to reduce the number of components is essential to optimize the weight. To save energy, it may be useful to reduce weight of components of an electric aircraft 100, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 100 and/or propulsors.

Referring still to FIG. 1, Aircraft may include at least a vertical propulsor 104 and at least a forward propulsor 108. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 104 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 1, at least a forward propulsor 108 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 104 and at least a forward propulsor 108 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 1, during flight, a number of forces may act upon the electric aircraft. Forces acting on an aircraft 100 during flight may include thrust, the forward force produced by the rotating element of the aircraft 100 and acts parallel to the longitudinal axis. Drag may be defined as a rearward retarding force which is caused by disruption of airflow by any protruding surface of the aircraft 100 such as, without limitation, the wing, rotor, and fuselage. Drag may oppose thrust and acts rearward parallel to the relative wind. Another force acting on aircraft 100 may include weight, which may include a combined load of the aircraft 100 itself, crew, baggage, and fuel. Weight may pull aircraft 100 downward due to the force of gravity. An additional force acting on aircraft 100 may include lift, which may act to oppose the downward force of weight and may be produced by the dynamic effect of air acting on the airfoil and/or downward thrust from at least a propulsor. Lift generated by the airfoil may depends on speed of airflow, density of air.

Figure 2:
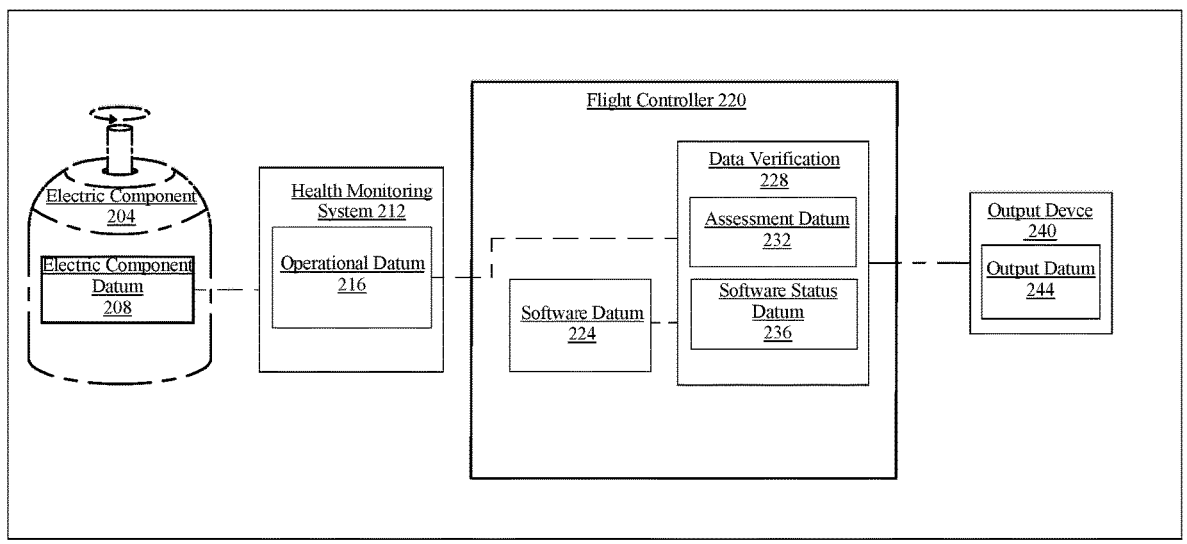
FIG. 2 is an illustrative embodiment of a system for data verification by a flight controller configured for use in an electric aircraft in block diagram form.

Referring now to FIG. 2, exemplary system for data verification by a flight controller configured for use in an electric aircraft is illustrated. System 200 includes an electric component 204 or a plurality of electric components. An "electric component", for the purposes of this disclosure, includes components related to, and mechanically coupled to an aircraft that manipulates a fluid medium in order to initiate, propel, and/or maneuver the aircraft through the fluid medium. Electric component 204 may include an energy storage component. Electric component 204 may include components used for take-off and/or landing of the aircraft such as a landing gear. A landing gear may include two main wheels towards the front of the aircraft and a single, much smaller, wheel or skid at the rear of the aircraft. Electric component 204 may include power sources, control links to one or more elements, fuses, and/or mechanical couplings used to drive and/or control any other electric component. Electric component 204 may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers (not shown) or other components for regulating motor speed, rotation direction, and/or dynamic braking, may include power sources, control links to one or more elements, fuses, and/or mechanical couplings used to drive and/or control any other electric component. Electric component 204 may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers (not shown) or other components for regulating motor speed, rotation direction, and/or dynamic braking.

Still referring to FIG. 2, electric component 204 may include an energy source. An energy source may include, for example, a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which in-flight system may be incorporated.

With continued reference to FIG. 2, electric component 204 may include any system of an electric aircraft that uses radio-frequency-identification (RFID). RFID systems may be referred to as a technology whereby digital data encoded in RFID tags or smart labels are captured by a reader via radio waves. RFID is may further include barcoding in that data from a tag or label are captured by a device that stores the data in a database. In a non-limiting embodiment, an electric component 204 may include components including an RFID tag and/or microchip, an antenna to send out and listen for radio signals, a reader connected to the antenna to decode the digital signals, and a computer system to control the process and store/use the data from the tag. Flight controller may be configured to detect RFID electric components. In a non-limiting embodiment, flight controller may use RFID to identify a serial number quickly, easily, and correctly from a tagged part with no human mistakes to invalidate the data. Such data may be stored an electric aircraft's system database, but with the advent of industry standards and high memory, RFID tags this data, which may also be stored on the part as a portable traceability record.

With continued reference to FIG. 2, each electric component 204 is configured to generate an electric component datum 208. "Electric component datum", for the purposes of this disclosure, refers to a piece of data that represents a physical value, electrical value, or combination thereof representing at least an element of data correlated to an electric component 204 and its conditions as described in the entirety of this disclosure.

With continued reference to FIG. 2, a system 200 includes health monitoring system 212. The health monitoring system may be implemented using one or more elements of circuitry, logic circuits, ASIC, microcontrollers, computing devices, and the like. Health monitoring system 212 may include a sensor or a plurality of sensors configured to detect operational datum 216. An "operational datum", for the purposes of this disclosure, refers to a piece of data that represents a physical value, electrical value, or combination thereof. In a non-limiting embodiment, health monitoring system 212 may detect a plurality of data produced by electric component 204 and translate that electric component value into an electrical signal that represents a value pertaining the status of the electric component. Plurality of data may include, but not limited to, values that indicate the operating efficiency, power, and the health of an electric component. Health monitoring system 212 may include a sensor or a plurality of sensors. Sensor may further include a motion sensor. A "motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 212 may include, torque sensor, gyroscope, accelerometer, torque sensor, magnetometer, inertial measurement unit (IMU), pressure sensor, force sensor, proximity sensor, displacement sensor, vibration sensor, among others. Sensor 212 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 2, system 200 includes a flight controller 220. Flight controller 220 is communicatively connected to at least an electric component and configured to receive operational datum 216 from health monitoring system 212. A "flight controller", for the purposes of this disclosure, refers to a component, or grouping of components, that determines the health and/or status of each component including software systems of the electric aircraft and output signals to at least an output device. Flight controller may initially start the electric aircraft. For instance, a user may press at least a button on a user interface that may include a flight controller to electrically turn on a plurality of systems and electric components 204 of the electric aircraft including, but not limited to, the electric motor, at least a health monitoring system 212, aircraft software systems, and the like or combination thereof. Flight controller, for example, may take in operational datum 216 from health monitoring system 212, the signal may be sent to flight controller, which performs any number or combinations of operations on those signals, then sends out output signals to an output display. Flight controller may also take in a software datum 224. Software datum 224 may include a software system or a plurality of software systems. "Software system", for the purposes of this disclosure, refers to a program or algorithm that is used to operate an aircraft. Software system may include, but not limited to a flight navigation system, flight communication system, flight control system, and the like. Flight navigation system may include the process of planning, recording, and controlling the movement of the aircraft. Flight control system may include the process and/or exchange of radio signals between a pilot and flight controller. Flight control Flight communication system may include the process and/or exchange of radio signals between a pilot and another user. In an embodiment, the flight controller 220 may generate a software datum 224 that may include the software versions of each software system of the electric aircraft.

With continued reference to FIG. 2, flight controller 220 may include and/or communicate with any computing device, including without limitation a microcontroller, microprocessor, digital signal processor (DSP) and/or system on a chip (SoC). Flight controller may be programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Flight controller may be designed and configured to operate electronic aircraft via fly-by-wire. Flight controller is communicatively coupled to each propulsor; as used herein, flight controller is communicatively coupled to each propulsor where flight controller is able to transmit signals to each propulsor and each propulsor is configured to modify an aspect of propulsor behavior in response to the signals. As a non-limiting example, flight controller may transmit signals to a propulsor via an electrical circuit connecting flight controller to the propulsor; the circuit may include a direct conductive path from flight controller to propulsor or may include an isolated coupling such as an optical or inductive coupling. Alternatively, or additionally, flight controller may communicate with a propulsor of plurality of propulsors 204a-n using wireless communication, such as without limitation communication performed using electromagnetic radiation including optical and/or radio communication, or communication via magnetic or capacitive coupling. Vehicle controller may be fully incorporated in an electric aircraft containing a propulsor and may be a remote device operating the electric aircraft remotely via wireless or radio signals, or may be a combination thereof, such as a computing device in the aircraft configured to perform some steps or actions described herein while a remote device is configured to perform other steps. Persons skilled in the art will be aware, after reviewing the entirety of this disclosure, of many different forms and protocols of communication that may be used to communicatively couple flight controller to propulsors. Persons skilled in the art, upon reviewing the entirety of this disclosure, will be aware of various ways to monitor resistance levels and apply resistance to linear thrust control, as used and described herein.

With continued reference to FIG. 2, flight controller 220 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Fall back flight control system 200 may include a single computing device operating independently, or may include two or more computing device operating in concert, in parallel, sequentially or the like; two or more computing devices may be included together in a single computing device or in two or more computing devices. Flight controller 220 may interface or communicate with one or more additional devices as described below in further detail via a network interface device. Network interface device may be utilized for connecting flight controller 220 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Flight controller 220 may include but is not limited to, for example, a computing device or cluster of computing devices in a first location and a second computing device or cluster of computing devices in a second location. Fall back flight control system 200 may include one or more computing devices dedicated to data storage, security, distribution of traffic for load balancing, and the like. Flight controller 220 may distribute one or more computing tasks as described below across a plurality of computing devices of computing device, which may operate in parallel, in series, redundantly, or in any other manner used for distribution of tasks or memory between computing devices. Flight controller 220 may be implemented using a "shared nothing" architecture in which data is cached at the worker, in an embodiment, this may enable scalability of flight controller 220 and/or computing device.

Still referring to FIG. 2, flight controller 220 may be designed and/or configured to perform any method, method step, or sequence of method steps in any embodiment described in this disclosure, in any order and with any degree of repetition. For instance, flight controller 220 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 220 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Flight controller 220, as well as any other component present within disclosed systems, as well as any other components or combination of components may be connected to a controller area network (CAN) which may interconnect all components for signal transmission and reception.

Still referring to FIG. 2, flight controller 220 may be configured to run a data verification 228. "Data verification", for the purposes of this disclosure, refer to a process where different inputs are checked for accuracy and/or inconsistencies. Data verification may include, without limitation, a routine, which may include validation rules, validation constraints, check routines, and the like, that check for correctness of the at least electric components and the at least software systems. "Correctness," for the purposes of this disclosure, refer to a physical value or state that represents an ideal or sufficient operability status or threshold an electric component must achieve or the latest software version for a software system. For example, data verification may include the operational datum 216 and software datum 224 as inputs and compare them to a data verification system's database and determine the state of the inputs as an assessment datum 232 and software status datum 236 as outputs.

With continued reference to FIG. 2, data corresponding to and/or included with data verification 228 includes an assessment datum 232 and software status datum 236. Assessment datum may include a plurality of data that represents the operating state of each electric component. In a non-limiting embodiment, assessment datum may include data regarding the at least a torque, a life cycle, and energy efficiency of an electric aircraft. Assessment datum may also include a performance chart describing the performance of an electric component in the electric aircraft's last flight. Assessment datum may further include remaining power of an electric energy source. Software status datum may include a plurality of data that represents the current software version an electric aircraft's software system is currently being used on. Data verification 228 may be configured to determine a software status datum 236 and an assessment datum 232 as a function of a machine-learning process. In an embodiment, assessment datum 232 may include the results of the check between the data verification's database and the operational datum 216 as a function of the health monitoring system 212. In another embodiment, software status datum 236 may include the results of the check between a data verification database and the software datum 224 as a function of the flight controller 220.

Still referring to FIG. 2, data verification 228 may further be configured to verify any survey data wherein survey data may include at least an assessment datum 232 and at least a software status datum 236. Data verification may further include a process of ensuring that which is being "verified" complies with certain constraints, for example without limitation system and/or electric component requirements, regulations, and the like. In some cases, verification may include comparing a product including an operational datum 216 and/or software datum 224, against one or more acceptance criteria. For instance, a certain type of survey data including at least an operational datum 216 and at least a software datum 224 may be required to contain data of a certain type, size, information range. Ensuring that an individual instance of survey data is in compliance with an acceptance criteria may, in some cases, constitute verification. In a non-limiting embodiment, data verification 228 may verify operational datum 216 and software datum 224 substantially before uploading them to a flight controller 220. In a non-limiting embodiment, verification may include ensuring that operational datum 216 and software datum 224 is complete, for example that all required survey data types, are present, readable, uncorrupted, and/or otherwise useful for the generating of at least an assessment datum 232 and at least a software status datum 236 by the data verification 228 as a function of at least the flight controller 220. In a non-limiting embodiment, some or all verification processes may be performed by flight controller 220. In a non-limiting embodiment, at least a machine-learning process may be used to verify the survey data by at least the data verification 228 and/or flight controller 220. Data verification 228 may use any machine-learning process described in this disclosure for this or any other function. In a non-limiting embodiment, at least one of validation and/or verification includes without limitation one or more of supervisory validation, machine-learning processes, graph-based validation, geometry-based validation, and rules-based validation.

Still referring to FIG. 2, software status datum 236 may include the results of the check between a data verification database and the software datum 224 as a function of the flight controller 22. For example, the check may include comparing the data from a database related to the correct software version for each software system and an ideal physical condition for each electric component. Checking may include pulling data from the operational datum 216 including a performance result of an electric component 2014, comparing the performance result with an ideal electric component performance criterion by determining whether the electric component's performance and state fall within the criterion, and generating an electronic signal that indicates an electric component is safe to be used or unsafe which may be an indication of a flight hazard. Performance criterion may include any acceptance criteria described herein. Electric component performance criterion may include, acceptance testing to determine if a set or requirements and/or specifications are met. In a non-limiting embodiment, requirements and/or specifications may include at least a threshold or a plurality of quantification of at least the qualities of individual electric components 204 and/or software systems. In a non-limiting embodiment, the checking may include the verification as described herein. In a non-limiting embodiment, a pilot may want to verify an electric component will function satisfactorily by interpreting a generated symbol from the data verification in which the data verification will compare the a data representing the functionality of the electric component with a standard data that may include a threshold representing an ideal functioning state the electric component must fall within to generate a symbol indicating the electric component is cleared to be used; if the data of the electric component does not fall within the threshold, the data verification may generate a symbol indicating the electric component must be replaced or repaired.

Still referring to FIG. 2, flight controller 220 is configured to generate an output datum 220 as a function of the data verification 228 to an output device 240. Output datum 244 may include an electrical signal consistent with the description of electrical signals regarding data verification 228. Output datum 244 includes an electrical signal configured to be transmitted to at least an output device 240. "Output datum", for the purposes of this disclosure, refer to a piece of data representing the results of a comparison of multiple pieces of data conducted in a data verification configured by a flight controller. In an embodiment, output datum may include the assessment datum 232 and software status datum 236 from the data verification to be displayed onto an output device 240. For example, the output datum may indicate a pilot whether each electric component is at risk of malfunction, need of replacement, safe to be used, and the like, as a symbol. "Output device", for the purposes of this disclosure, refers to a visual apparatus that is comprised of compact flat panel designs, liquid crystal display, organic light-emitting diode, or combination thereof to present visual information superimposed on spaces. Output device 240 may include a graphical user interface (GUI), multi-functional display (MFD), primary flight display (PFD), gauges, dials, screens, touch screens, speakers, haptic feedback device, live feed, window, combination thereof, or another display type not listed here. In a nonlimiting embodiment, output device may include a mobile computing device like a smartphone, tablet, computer, laptop, client device, server, a combination thereof, or another undisclosed display alone or in combination. Output device may be disposed in at least a portion of a cockpit of an electric aircraft. Output device may be a heads-up display (HUD) disposed in goggles, glasses, eye screen, or other headwear a pilot or user may be wearing.

Still referring to FIG. 2, output device 240 may further include monitor display that may display information in pictorial form. Monitor display may include visual display, computer, and the like. For example, monitors display may be built using liquid crystal display technology that displays to the pilot information from a computer's user interface. Output device may include any processor and/or computing device containing any processor suitable for use in and/or with augmented reality device 104 as described above. Output device may include any component and/or element suitable for use with augmented reality over-head display. Output device may be designed and/or configured to perform any method, method step, or sequence of method steps in any embodiment described in this disclosure, in any order and with any degree of repetition. For instance, output device 240 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Output device 240 may perform any step or sequence of steps as described in this disclosure in parallel, such as simultaneously and/or substantially simultaneously performing a step two or more times using two or more parallel threads, output device 240 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 3:
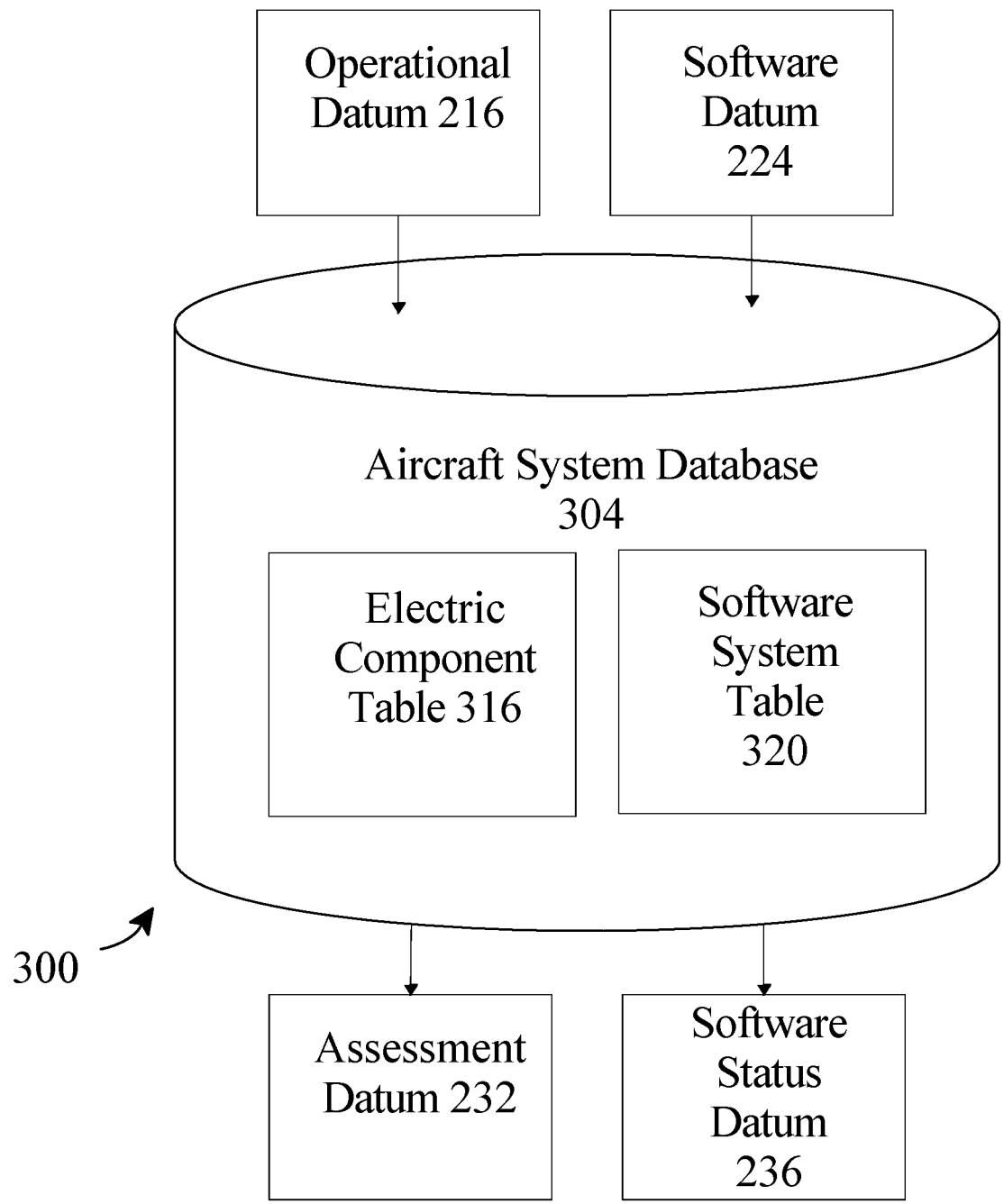
FIG. 3 is an illustrative embodiment of a database for the data verification for use in an electric aircraft in block diagram form.

Now referring to FIG. 3, a non-limiting exemplary embodiment of a database 300 for data verification for use in an electric aircraft in block diagram form is shown. Operational datum 216 for a plurality of electric components may be stored and/or retrieved in an aircraft system database 304. Operational datum 216 for a training data of a machine learning model may also be stored and/or retrieved from the aircraft system database 304. Flight controller 220 may store and/or retrieve machine-learning models, classifiers, among other determinations, I/O data, heuristics, algorithms, and the like, from aircraft system database 304.

Continuing in reference to FIG. 3, aircraft system database 304 may be implemented, without limitation, as a relational database, a key-value retrieval database such as a NOSQL database, or any other format or structure for use as a database that a person skilled in the art would recognize as suitable upon review of the entirety of this disclosure. Aircraft system database 304 may alternatively or additionally be implemented using a distributed data storage protocol and/or data structure, such as a distributed hash table and the like. Aircraft system database 304 may include a plurality of data entries and/or records related to software versions and ideal electric component health or status. Data entries aircraft system database 304 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistent with this disclosure.

Further referring to FIG. 3, aircraft system database 304 may include, without limitation, electric component table 316 and software system table 320. Electric component table 316 may include data regarding the physical health or state of an electric component or a plurality of electric components further including thresholds, scores, metrics, values, categorizations, and the like that flight controller 220 may use to calculate, derive, filter, retrieve, and/or store assessment datum 232, identifiers related with cohorts of aircraft components, and the like. Determinations by a machine-learning process, machine-learning model, ranking function, and/or classifier, may also be stored and/or retrieved from the aircraft system database 304. As a non-limiting example, aircraft system database 304 may organize data according to one or more instruction tables. One or more aircraft system database 304 tables may be linked to one another by, for instance in a non-limiting example, common column values. For instance, a common column between two tables of aircraft system database 304 may include an identifier of a submission, such as a form entry, textual submission, accessory device tokens, local access addresses, metrics, and the like, for instance as defined herein; as a result, a search by a flight controller 220 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables.

Continuing in reference to FIG. 3, in a non-limiting embodiment, one or more tables of aircraft system database 304 may include, as a non-limiting example, software system table 320, which may include data regarding software datum 224, thresholds, scores, metrics, values, categorizations, and the like, that system 200 may use to calculate, derive, filter, retrieve and/or store software status datum 236, identifiers related with cohorts of users, and the like. Software system table 320 may include data on current software version of each software system, the latest software version for each software system, and a predetermined software version to be selected and/or used for the electric aircraft. One or more tables may include, without limitation, a heuristic table, which may organize rankings, scores, models, outcomes, functions, numerical values, scales, arrays, matrices, and the like, that represent determinations, probabilities, metrics, parameters, values, standards, indexes, and the like, include one or more inputs describing potential mathematical relationships, as described herein. In an embodiment, the data verification be checking for updates on the operability of each electric component and software system. The verification may further check if the components are operating as they should and/or correctly and whether or not the software for each software system is correct. "Correct", in terms of this disclosure, may refer to a software version that is predetermined to be used by a user and not necessarily the latest software version. A person skilled in the art, upon benefit of this disclosure in full, may appreciate that each state or risk level of an electric component or software system is unique from one another.

Figure 4:
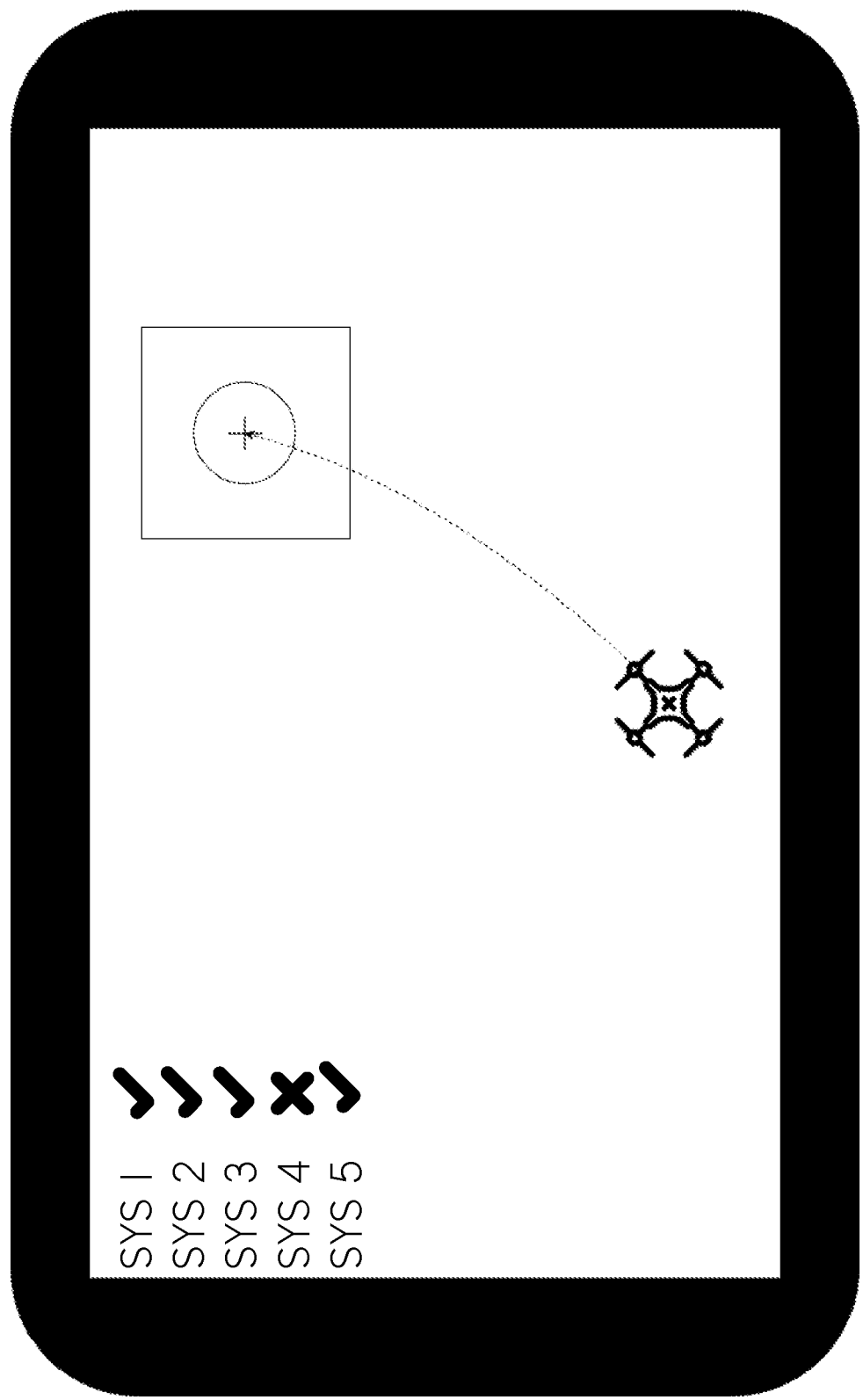
FIG. 4 is a representative screenshot depicting one aspect of an exemplary output device implemented in accordance with aspects of the invention.

Referring now to FIG. 4, a representative screenshot depicting one aspect of an exemplary output device implemented in accordance with aspects of the invention is shown. Output device may include a graphical user interface, (GUI). As described above, GUI may display the output datum in graphical form. Graphical form may include a two-dimensional plot of two variables that represent data received by the data verification as function of the flight controller, such a list of each electric component and software system and its status. In a nonlimiting example, the display may display different color schemes and signs the state and health of each electric component and the validity of each software system as disclosed above.

Figure 5:
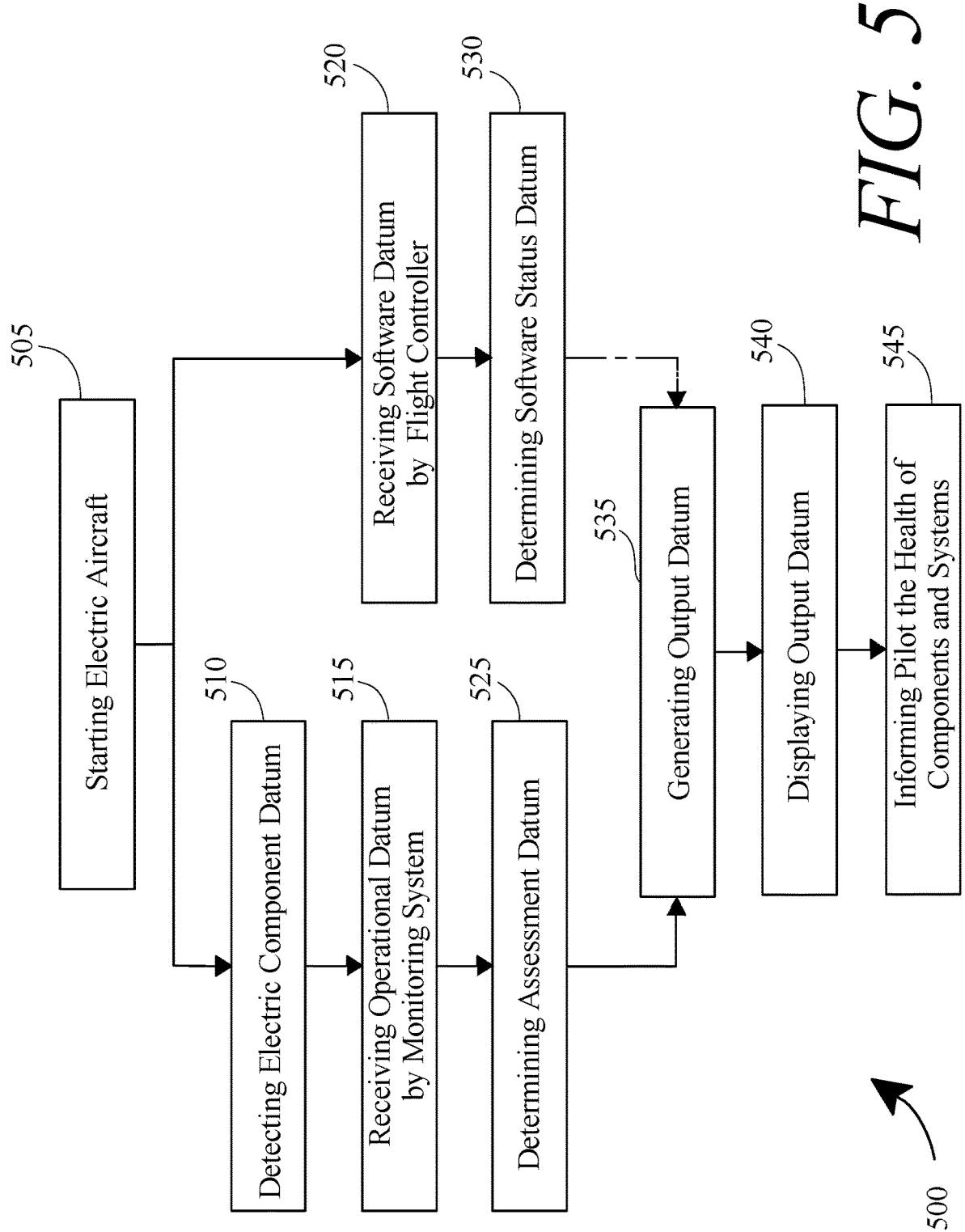
FIG. 5 is an exemplary method of verifying health monitoring systems and software systems for use in an electric aircraft presented in process flow diagram form.

Referring now to FIG. 5, a method 500 of data verification which includes verifying the health monitoring system and software system for use in an electric aircraft is illustrated in a process flow diagram. Method 500 may include step 505 which may include starting an electric aircraft. Starting an electric aircraft my include any process of turning on an electric aircraft as described herein. The electric aircraft may include any electric component as described herein. One of ordinary skill in the art, after reviewing the entirety of this disclosure, would appreciate the electric aircraft may be a virtual representation of. One of ordinary skill in the art, after reviewing the entirety of this disclosure, would further appreciate the step of starting an electric aircraft to verify the status of each major and/or minor aircraft component before lift-off and/or flight that method 500 is virtually representing as.

With continued reference to FIG. 5, at step 510, method 500 includes detecting electric component datum 208 produced by electric component 204. Electric component datum 208 may be any electric component as described herein. Electric component 204 may include a propulsor, electric motor, battery unit, landing gear, or the like, and may be mechanically and/or electronically coupled to the electric aircraft. Step 510 may further include checking the state of health of an electric component. Checking may include comparing operational datum 216 as a function of a health monitoring system 212 with a corresponding data within the electric component table 316 to determine whether the electric component 204 the operational datum 216 is derived from meets the requirements for safe operability within the electric aircraft.

With continued reference to FIG. 5, at step 515, method 500 include receiving operational datum 216 as a function of a health monitoring system 212. Operational datum 216 may be any operational datum as described herein. Health monitoring system 212 may include a sensor to detect electric component datum 208 and may further include a sensor suite including multiple sensors. Sensor may be any sensor as described herein.

With continued reference to FIG. 5, method 500 includes, at step 220, receiving software datum 224 as a function of the flight controller 220. The fight controller 220 may include receiving a software status for each software system that may be electronically coupled to the electric aircraft and generate a software datum 224. Software datum 224 may include any software datum as described herein.

With continued reference to FIG. 5, method 500 includes, at step 525, determining assessment datum 232 as a function of the data verification 228. Assessment datum 232 may include any assessment datum as described herein. Step 235 may include comparing the operational datum 216 with the electric component table 316 as a function of the aircraft system database 304. Method 500 may include one or more machine-learning processes to determine the assessment datum 232.

With continued reference to FIG. 5, method 500 includes, at step 530, determining software status datum 224 as a function of the data verification 228. Software status datum 224 may include any software status datum as described herein. Determining software status datum 224 may include comparing the software datum 224 with the software version table 320 as a function of the aircraft system database. Method 500 may include one or more machine-learning processes to determine the software status datum 236.

With continued reference to FIG. 5, method 500 includes, at step 535, generating output datum 244 as a function of the assessment datum 232 and software status datum 236. Output datum 244 may include any output datum as described herein.

With continued reference to FIG. 5, method 500 includes, at step 540, displaying output datum 224 as a function of the output device 220. Output device 220 may include any output device as described herein. Displaying the output datum may include, but not limited to, displaying a signal or symbol representing the software version state of each monitoring system to a pilot, a confirmation sign indicating a system's software is up to date to a pilot, a warning sign indicating a system's software is outdated to a pilot, or combination thereof. Displaying of the output datum may further comprise using a text notification. One of ordinary skill in the art would appreciate, after reviewing the entirety of this disclosure, plurality of signals and/or signs that map to a unique piece of information that a pilot may easily understand.

With continued reference to FIG. 5, method 500 includes, at step 545, informing a pilot the health of components and systems of an electric aircraft at the start up. Health of components and systems may include any health as described herein. One of ordinary skill in the art would appreciate, after reviewing the entirety of this disclosure, a pilot may easily interpret the information being presented to the pilot that method 500 is visually representing.

Figure 6:
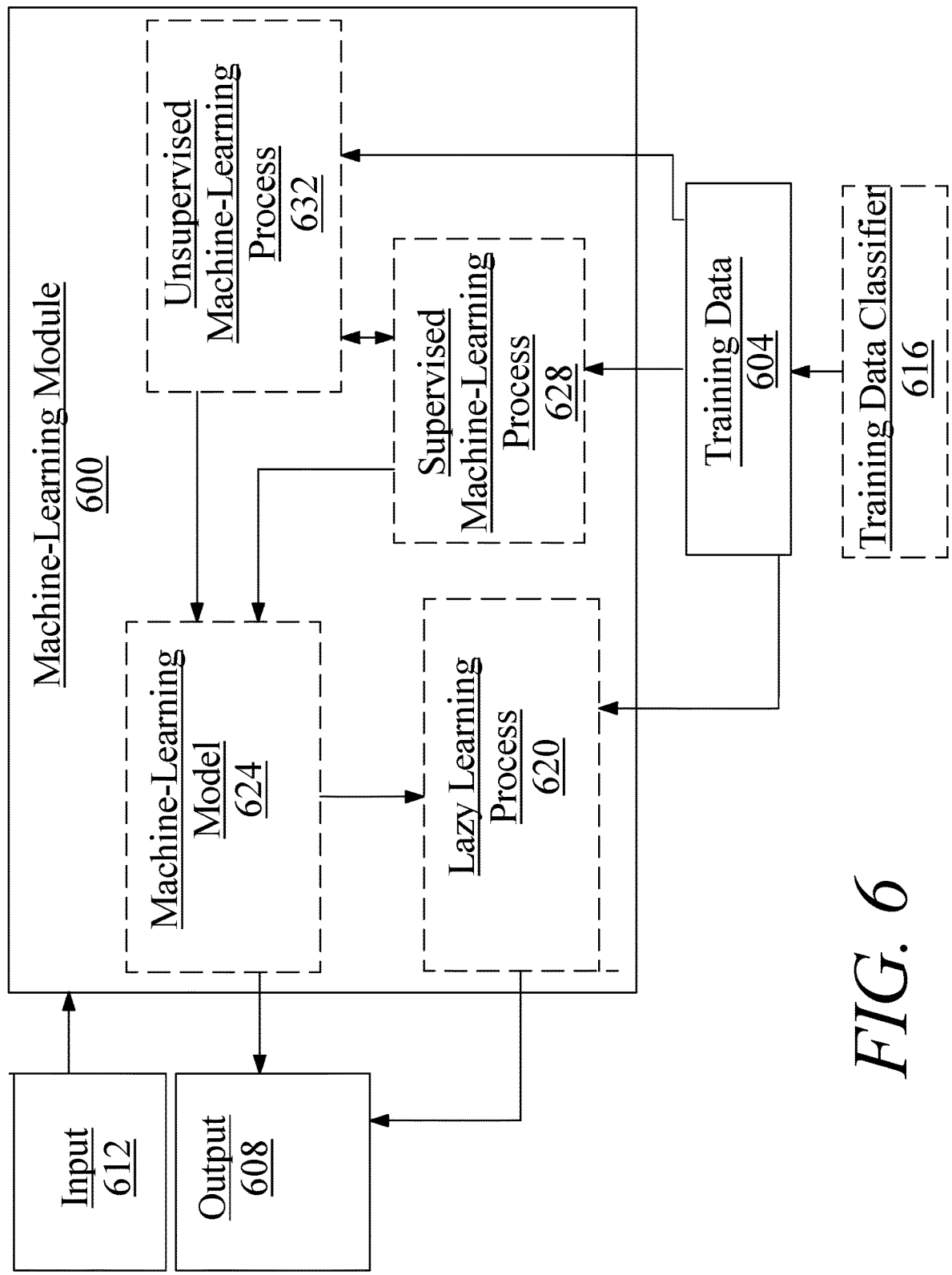
FIG. 6 is a block diagram of an exemplary embodiment of a machine-learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example inputs may include an operational datum 216 and software datum 224 and the outputs may include an assessment datum 232 and software status datum 236.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a process whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbor's classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to versions and/or states of aircraft components and systems. The state of aircraft components may be categorized to different levels of risk pertaining to component malfunction or success rate in operating. The state of aircraft components may further be categorized into different levels of aircraft component health to inform a pilot if a component is satisfactory and/or safe for the electric aircraft to use at the star up based on a check and/or comparison with data from a database. The version of aircraft system may be categorized to different levels of competent software versions a software system may be updated as or needs to be updated to.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbor's algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbor's algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 7:
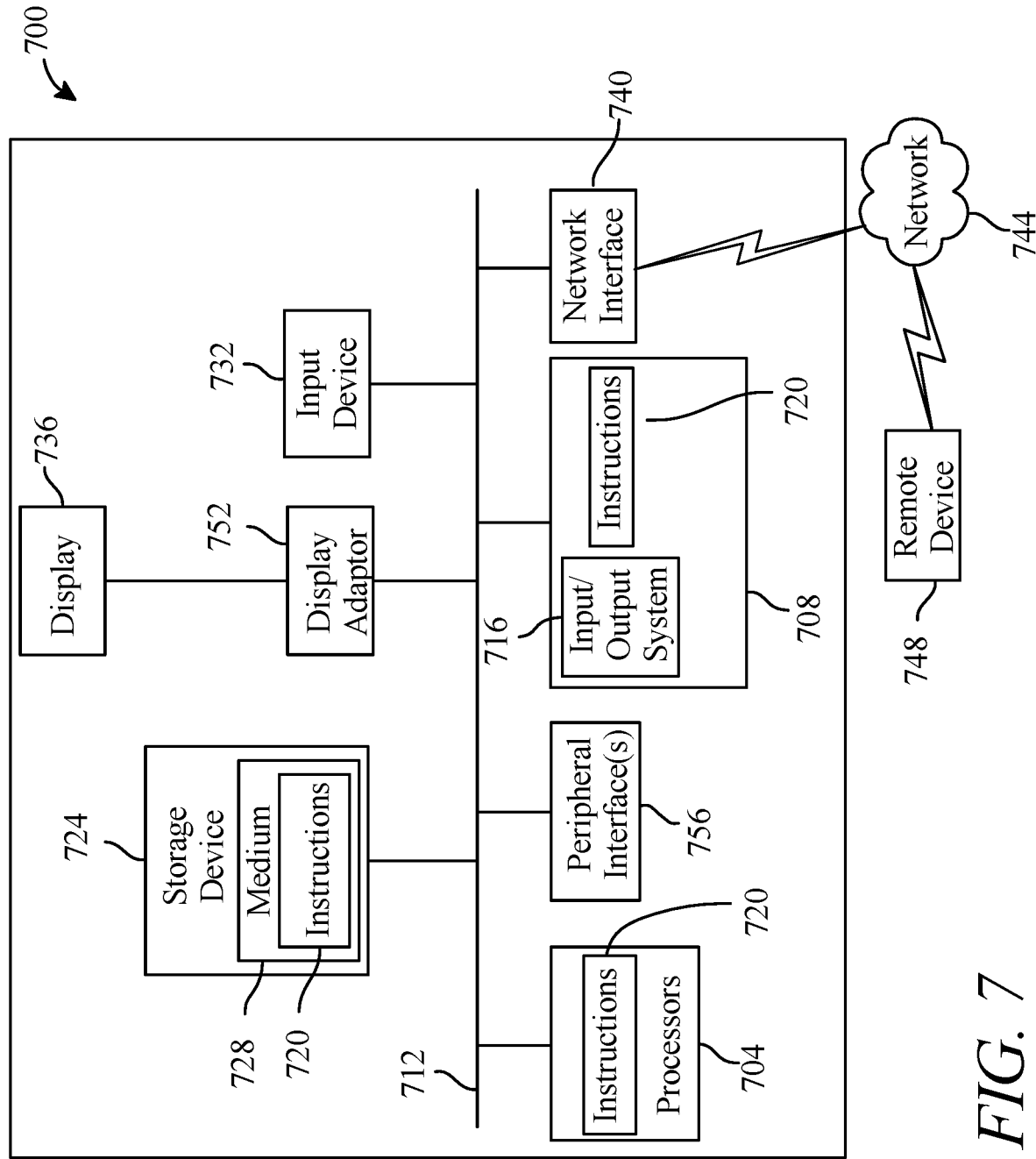
FIG. 7 is a block diagram of a computing system that can be used to implement any one or more of the methodologies disclosed herein and any one or more portions thereof.

Referring now to FIG. 7, an exemplary embodiment of a computing device 700 is illustrated. System includes a computing device, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device may include a single computing device operating independently, or may include two or more computing device operating in concert, in parallel, sequentially or the like; two or more computing devices may be included together in a single computing device or in two or more computing devices. computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device may include but is not limited to, for example, a computing device or cluster of computing devices in a first location and a second computing device or cluster of computing devices in a second location. computing device may include one or more computing devices dedicated to data storage, security, distribution of traffic for load balancing, and the like, computing device may distribute one or more computing tasks as described below across a plurality of computing devices of computing device, which may operate in parallel, in series, redundantly, or in any other manner used for distribution of tasks or memory between computing devices, computing device may be implemented using a "shared nothing" architecture in which data is cached at the worker, in an embodiment, this may enable scalability of system 100 and/or computing device.

With continued reference to FIG. 7, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks, computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for data verification of an electric aircraft at start up, the system comprising:
    at least an electrical component;
    a health monitoring system configured to detect, by a sensor, an operational datum from the at least an electric component;
    a flight controller communicatively connected to the at least an electrical component, the flight controller configured to:
        start the electric aircraft;
        receive an operational datum from the health monitoring system;
        identify a software datum of each software system of a plurality of software systems of the electric aircraft;
        perform a data verification, wherein the data verification comprises using a machine-learning process configured to:
            receive the operational datum and the software datum as inputs; and
            determine an assessment datum and a software status datum as a function of the inputs, wherein the software status datum includes a comparison of the software datum to an acceptance criterion; and
        generate an output datum from the assessment datum and software status datum; and
    an output device, the output device configured to:
        display the output datum in a graphical form, wherein the output datum includes a software system table comprising a plurality of software status datums.

2. The system of claim 1, wherein the data verification system is further configured to perform the data verification at the start of an electric vertical take-off and landing aircraft (eVTOL).

3. The system of claim 1, wherein the at least an electrical component includes at least a radio-frequency identification (RFID) system.

4. The system of claim 1, wherein the health monitoring system includes a sensor.

5. The system of claim 4, wherein the sensor includes a plurality of sensors.

6. The system of claim 4, wherein the sensor includes a gyroscope.

7. The system of claim 4, wherein the sensor includes a motion sensor.

8. The system of claim 4, wherein the sensor includes an inertial measurement unit (IMU).

9. The system of claim 1, wherein the at least an electrical component includes a propulsor.

10. The system of claim 1, wherein the at least an electrical component includes at least an electric energy source.

11. The system of claim 1, wherein the at least an electrical component includes a landing gear.

12. The system of claim 1, wherein the plurality of software systems comprises:
    at least a flight navigation system;
    at least a flight communication system; and
    at least a flight control system;
    wherein the software status datum includes a software status datum of the flight navigation system.

13. The system of claim 1, wherein the verification system is configured to determine the software status datum and the assessment datum as a function of the machine-learning process.

14. The system of claim 1, wherein the output device further comprises a computing device including a graphical user interface (GUI).

15. A method of data verification of an electric aircraft at start up, the method comprising:
    starting, by a flight controller, an electric aircraft;
    detecting, by a sensor of a health monitoring system, an operational datum from at least an electric component;
    receiving, by the flight controller, an operational datum as a function of a monitoring system or a plurality of monitoring systems;
    receiving, by the flight controller, a software datum from each software system of a plurality of software systems of the electric aircraft;
    determining an assessment datum as a function of the operational datum;
    performing a data verification, wherein the data verification comprises using a machine-learning process configured to:

receive the operational datum and the software datum as inputs; and determine an assessment datum and a software status datum as a function of the inputs, wherein the software status datum includes a comparison of the software datum to an acceptance criterion;

generating an output datum from the assessment datum and software status datum as a function of the aircraft system database, wherein the output datum includes a software system table comprising a plurality of software status datums;

displaying, by an output device, the output datum in a graphical form as function of the data verification comprising:

a signal or symbol representing the software version state of each health monitoring system to a pilot;

a confirmation sign indicating a software system is up to date;

a warning sign indicating the software system is outdated; and informing the pilot, the integrity of the health monitoring system and the software system of the electric aircraft including:

a degradation of the software system and the monitoring system of the electric aircraft; and an indication of an occurrence of a fault of the software system and the health monitoring system.

16. The method of claim 15, wherein the detecting of the operational datum further comprises checking the state of health of an electric component.

17. The method of claim 15, wherein determining the software status datum comprises comparing the software datum with the software system table as a function of the aircraft system database.

18. The method of claim 15, wherein the data verification system is configured to determine the assessment datum and the output datum as a function of a machine-learning process.

19. The method of claim 15, wherein the correct version of the software system for each health monitoring system includes a software version differing from a latest software version.

20. The method of claim 15, wherein the displaying of the output datum further comprises using a text notification.

* * * * *